(12) United States Patent
Bensadoun et al.

(10) Patent No.: US 12,031,686 B2
(45) Date of Patent: *Jul. 9, 2024

(54) DEVICE AND METHOD FOR STORING AND SUPPLYING FLUID FUEL

(71) Applicant: L'Air Liquide, Societe Anonyme pour l'Etude et l'Exploitation des Procedes Georges Claude, Paris (FR)

(72) Inventors: Emmanuel Bensadoun, Sassenage (FR); Patrick Bravais, Sassenage (FR); Patrick Sanglan, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 385 days.

This patent is subject to a terminal disclaimer.

(21) Appl. No.: 17/441,641

(22) PCT Filed: Mar. 12, 2020

(86) PCT No.: PCT/FR2020/050519
§ 371 (c)(1),
(2) Date: Sep. 21, 2021

(87) PCT Pub. No.: WO2020/188193
PCT Pub. Date: Sep. 24, 2020

(65) Prior Publication Data
US 2022/0146047 A1    May 12, 2022

(30) Foreign Application Priority Data

Mar. 21, 2019  (FR) ...................................... 1902922

(51) Int. Cl.
*F17C 7/04*   (2006.01)
*F17C 5/00*   (2006.01)
(Continued)

(52) U.S. Cl.
CPC ................ *F17C 7/04* (2013.01); *F17C 5/007* (2013.01); *F17C 13/025* (2013.01); *F17C 13/04* (2013.01);
(Continued)

(58) Field of Classification Search
CPC .... F27C 7/04; F27C 13/04; F27C 2205/0326; F27C 2205/0338; F27C 2221/012;
(Continued)

(56) References Cited

U.S. PATENT DOCUMENTS 2,449,352 A    9/1948  White
5,440,477 A    8/1995  Rohrberg et al.
(Continued)

FOREIGN PATENT DOCUMENTS

CN    206 180 468    5/2017
CN    207 514 561    6/2018
(Continued)

OTHER PUBLICATIONS

International Search Report and Written Report for PCT/FR2020/050519, mailed Aug. 10, 2020.
(Continued)

*Primary Examiner* — Elizabeth J Martin
(74) *Attorney, Agent, or Firm* — Justin K. Murray

(57) ABSTRACT

A device a device for storing and supplying fluid fuel is provided, in which the device may include: a tank for liquefied fuel gas balanced with a gaseous phase, in particular a hydrogen gaseous phase, a circuit for filling the tank, at least one circuit for extracting fluid from the tank, at least one circuit for controlling the pressure in the tank, the circuits for filling, extracting and controlling the pressure comprising a valve assembly arranged in a housing which is separate from the tank, the housing being detachably connected to the tank via a removable mechanical coupling
(Continued)

system, the extraction circuit, the pressure control circuit and the filling circuit comprising an assembly of removable fluid connections which are located at the junction between the tank and the housing and configured to enable separation between the portions of circuits located in the tank and in the housing when removing the housing from the tank.

18 Claims, 2 Drawing Sheets

(51) Int. Cl.
*F17C 13/02* (2006.01)
*F17C 13/04* (2006.01)

(52) U.S. Cl.
CPC .......... *F17C 2201/0109* (2013.01); *F17C 2201/035* (2013.01); *F17C 2201/056* (2013.01); *F17C 2203/0391* (2013.01); *F17C 2203/0629* (2013.01); *F17C 2205/0126* (2013.01); *F17C 2205/0326* (2013.01); *F17C 2205/0338* (2013.01); *F17C 2205/0352* (2013.01); *F17C 2205/0388* (2013.01); *F17C 2205/0394* (2013.01); *F17C 2221/012* (2013.01); *F17C 2223/0161* (2013.01); *F17C 2227/0107* (2013.01); *F17C 2227/0306* (2013.01); *F17C 2227/044* (2013.01); *F17C 2250/032* (2013.01); *F17C 2250/043* (2013.01); *F17C 2260/015* (2013.01); *F17C 2265/031* (2013.01); *F17C 2265/061* (2013.01); *F17C 2265/066* (2013.01); *F17C 2270/0168* (2013.01); *F17C 2270/0184* (2013.01)

(58) Field of Classification Search
CPC ...... F27C 2223/0161; F27C 2227/0306; F27C 2227/044; F27C 2250/043; F27C 2270/0184
See application file for complete search history.

(56) References Cited

U.S. PATENT DOCUMENTS

| 8,113,006 B2* | 2/2012 | Rech .................. F17C 7/02 62/50.3 |
| 2014/0013777 A1 | 1/2014 | Sun-hae |
| 2017/0343159 A1 | 11/2017 | Raholm et al. |
| 2018/0224068 A1 | 8/2018 | Querd et al. |
| 2019/0338887 A1 | 11/2019 | Ehgartner et al. |

FOREIGN PATENT DOCUMENTS

| CN | 108 679 438 | 10/2018 |
| DE | 10 2017 201045 | 7/2018 |
| WO | WO 2011 124 748 | 10/2011 |
| WO | WO 2015 040 268 | 3/2015 |
| WO | WO 2018 141 411 | 8/2018 |

OTHER PUBLICATIONS

French Search Report and Written Opinion for FR 1 902 922, mailed Nov. 18, 2019.

* cited by examiner

DEVICE AND METHOD FOR STORING AND SUPPLYING FLUID FUEL

CROSS-REFERENCE TO RELATED APPLICATIONS

This application is a § 371 of International PCT Application PCT/FR2020/050519, filed Mar. 12, 2020, which claims § 119(a) foreign priority to French patent application FR 1 902 922, filed Mar. 21, 2019.

BACKGROUND

Field of the Invention

The invention relates to a device for storing and for supplying fluid fuel, as well as to a method for supplying fuel.

More specifically, the invention relates to a device for storing and for supplying fluid fuel comprising a reservoir of liquefied fuel gas in equilibrium with a gas phase, in particular hydrogen, a circuit for filling the reservoir, at least one circuit for tapping fluid from the reservoir, at least one circuit for regulating the pressure in the reservoir, the filling, tapping and pressure regulating circuits comprising a set of valves arranged in a housing separate from the reservoir.

Related Art

In some applications of vehicles using a fuel cell for generating the drive force of the vehicle, and/or the electrical energy for powering electrical equipment, the vehicle has a liquefied hydrogen reservoir. The presence of an on-board liquid hydrogen reservoir and its associated fluid circuits requires safety measures, whilst allowing it to be tapped, allowing multiple filling operations and allowing maintenance without immobilizing the vehicle for too long.

SUMMARY OF THE INVENTION

One aim of the present invention is to propose a device allowing all or some of these constraints to be addressed as well as possible.

To this end, the device according to the invention, also in accordance with the generic definition provided in the above preamble, is basically characterized in that the housing is removably connected to the reservoir via a demountable mechanical coupling system, the tapping circuit, the pressure regulating circuit and the filling circuit comprising a set of demountable fluidic connectors located at the junction between the reservoir and the housing and configured to allow separation between portions of circuits located in the reservoir and in the housing during the demounting of the housing with respect to the reservoir.

Furthermore, embodiments of the invention can comprise one or more of the following features:
- in the position connected to the reservoir, the housing defines a closed volume filled with a neutral atmosphere, i.e. predominantly comprising an inert gas such as helium;
- in the position connected to the reservoir, the housing defines a sealed, closed so vacuum volume, i.e. at a pressure ranging between $10^{-9}$ mbar and $10^{-1}$ mbar;
- the set of valves arranged in the housing comprises or is made up of all-or-nothing type valves;
- the set of valves arranged in the housing comprises or is made up of electrical control type valves;
- the filling circuit of the reservoir comprises a liquid filling pipe provided with an upstream end emerging at a wall of the housing and a downstream end emerging at a wall of the reservoir, in particular at a lower end of the reservoir, said liquid filling pipe comprising at least one valve located in the housing;
- the circuit for tapping fluid from the reservoir comprises a tapping pipe provided with a first upstream end emerging at a wall of the reservoir, in particular at a lower end of the reservoir, and a downstream end emerging at a wall of the housing, said tapping pipe comprising, arranged in series, at least one valve and a heating heat exchanger;
- the circuit for tapping fluid from the reservoir comprises a second upstream end emerging at a wall of the reservoir at an upper end of the reservoir, said second upstream end being connected to the downstream end via at least one valve and the heating heat exchanger;
- the circuit for regulating the pressure in the reservoir comprises a pressurization pipe comprising an upstream end emerging at a wall of the reservoir, in particular at a lower end of the reservoir, and a downstream end emerging at a separate point of a wall of the reservoir, in particular at an upper end of the reservoir, said pressurization pipe comprising, arranged in series, at least one valve and a heating heat exchanger;
- the circuit for regulating the pressure in the reservoir comprises a heating exchanger housed in the reservoir for thermally exchanging with the fuel stored in the reservoir, the exchanger being fed, via a pipe, with a hot fluid, in particular fuel that is tapped from the reservoir and is heated after being tapped;
- the device comprises at least one from among: a sensor for measuring the pressure in the reservoir, a sensor for measuring the pressure of the fluid in the housing, said at least one sensor being located in the housing;
- the device comprises an electronic data storage and processing component connected to the set of valves, the electronic data storage and processing component being configured to control the opening or the closing of the valves;
- the pressure in the reservoir is increased via a heater located in the reservoir;
- the heater is a heat exchanger fed with fuel that is tapped from the reservoir and is heated and that is set to exchange heat with the fuel in the reservoir;
- the device comprises a rapid drainage system comprising a sealed container containing a pressurized gas, in particular helium, a component for opening the container and a discharge pipe connecting the container to the storage volume of the reservoir, as well as a discharge pipe provided with at least one valve or a flap for discharging the fluid out of the reservoir.

The invention also relates to a vehicle comprising a device according to any one of the features mentioned above or hereafter.

The invention also relates to a method for providing a consumer with fuel from a storage and supply device according to any one of the features mentioned above or hereafter, wherein, when the pressure in the reservoir is higher than a first determined threshold, the fuel is tapped in gas form from the gas phase of the reservoir and, when the pressure in the reservoir is lower than a second determined threshold, the fuel is tapped in liquid form from the gas phase of the reservoir.

According to other possible distinguishing features:

the pressure in the reservoir is increased by withdrawing fuel in liquid form from the liquid phase of the reservoir, by heating this withdrawn liquid fuel, then reintroducing it into the reservoir;

the pressure in the reservoir is increased via a heater located in the reservoir;

the heater is a heat exchanger fed with fuel that is tapped from the reservoir and is heated and that is set to exchange heat with the fuel in the reservoir.

The invention can also relate to any alternative device or method comprising any combination of the features mentioned above or hereafter within the scope of the claims.

BRIEF DESCRIPTION OF THE FIGURES

Further distinguishing features and advantages will become apparent upon reading the following description, which is provided with reference to the figures, in which.

DETAILED DESCRIPTION OF THE INVENTION

Figure 1:
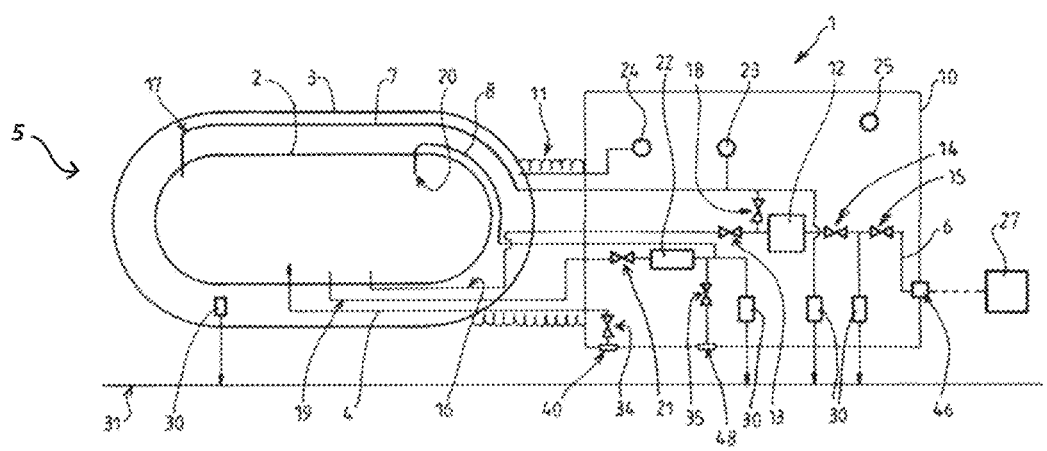
FIG. 1 shows a schematic and partial side section view illustrating a first example of the structure and of the operation of a device for storing and for supplying fuel.

The device 1 for storing and for supplying fluid fuel illustrated in FIG. 1 comprises a reservoir 5 of liquefied fuel gas in equilibrium with a gas phase, the liquefied fuel particularly can be hydrogen (H2).

Preferably, the reservoir is a dual enclosure cryogenic type reservoir, i.e. comprising an internal enclosure or reservoir 2 containing the cryogenic fluid and an external enclosure or reservoir 2. The internal 2 and external 3 enclosures are spaced apart and together define a thermal insulation space, in particular a vacuum space (pressure ranging between $10^{-9}$ mbar and $10^{-1}$ mbar and comprising an insulation material ("MLI" multilayer insulation, for example).

Typically, the inter-wall 5 vacuum between internal reservoir 2 and external reservoir 3 can range between $10^{-3}$ mbar and $10^{-5}$ mbar, but other insulations and pressure ranges can be contemplated, such as non-vacuum insulation foam, to an ultra-high vacuum at $10^{-9}$ mbar, for example.

The device 1 comprises a circuit 4 for filling the reservoir 5, a circuit 6, 7 for tapping fluid from the internal reservoir 2 and a circuit 8, 9 for regulating the pressure in the internal reservoir 2.

The filling 4, tapping 6, 7 and pressure regulating 8, 9 circuits comprise a set of valves 13, 14, 15, 18, 21, 34 arranged in a housing 10 separate from the reservoir 5, i.e. the set of valves is in a housing 10 separate from the external wall of the external reservoir 3.

Figure 2:
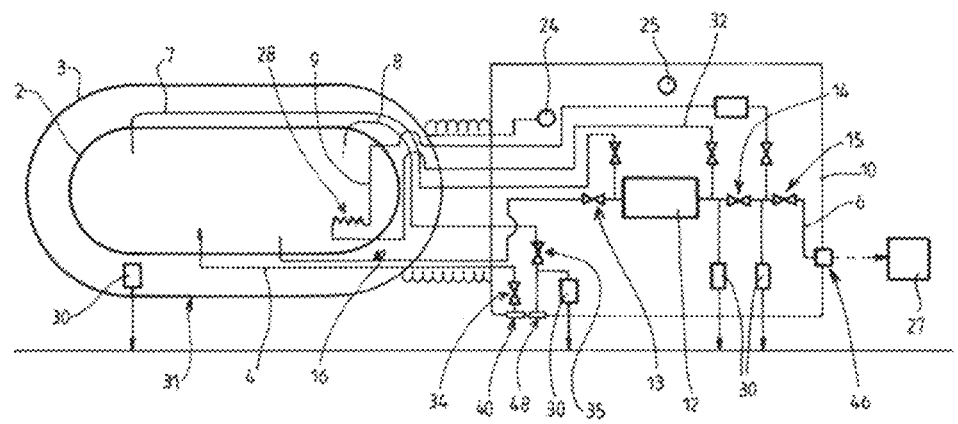
FIG. 2 shows a schematic and partial side section view illustrating a second example of the structure and of the operation of a device for storing and for supplying fuel.

This housing 10 is mechanically and fluidly removably connected to the reservoir 5 via a demountable mechanical coupling system 11 (see FIG. 1 and FIG. 2).

In other words, the tapping circuit 6, 7, the pressure regulating circuit 8, 9 and the filling circuit 4 comprise, for example, a set of demountable fluidic connectors located at the junction between the reservoir 5 and the housing 10 and configured to allow separation between portions of circuits 4, 6, 7, 8, 9 respectively located in the reservoir 5 and in the housing 10 during the demounting of the housing 10 with respect to the reservoir 5.

The housing 10 can contain all or some of the equipment of the device, in particular: the flow control components (valves), the fluid heating components (exchangers or other), the instrumentation (sensors), safety flaps.

This allows physical separation of the housing 10, which thus forms a removable, replaceable compartment or casing for equipment. This allows the housing 10 to be removed in order to be maintained and, during this time, allows it to be replaced by another housing 10 on the vehicle 29 in order to prevent it from being immobilized. This particularly allows the housing 10 to be removed without having to previously drain the reservoir 5.

Preferably, the housing 10 defines a closed volume, which is fluidly independent of the internal volume of the reservoir, and in particular of the volume of the reservoir 5 to which it is connected.

In other words, in the position connected to the reservoir 5, the internal volume of the housing 10 is not connected to the internal volume of the reservoir (inter-wall space in particular), the gas atmospheres are independent and can be different (in terms of composition and/or of pressure and/or of temperature).

Of course, as a variant, when the housing 10 is connected to the reservoir, the internal volume of the housing 10 could be connected to the internal volume of the reservoir to which it is connected (forming a homogeneous gas volume).

Advantageously, at least in the position connected to the reservoir 5, the housing 10 defines a closed volume filled with a neutral atmosphere, i.e. predominantly comprising an inert gas such as helium. More generally, the atmosphere can include or be made up of a gas mixture at the temperature of the liquid stored in the reservoir.

As a variant or in combination, in the position connected to the reservoir 5, the housing 10 defines a sealed, closed vacuum volume, i.e. at a pressure ranging between $10^{-1}$ mbar and $10^{-9}$ mbar. This vacuum can be obtained, for example, from an atmosphere made up of air.

Thus, the main equipment of the circuits is housed in a confined housing and any breakdown or possible leak does not endanger the reservoir. These leaks particularly can be collected via safety flaps 30, which discharge excess pressure outward, in particular toward a collection pipe 31.

Arranging the equipment in a separate housing 10 allows any protection (dual wall) for each item of equipment to be dispensed with. The equipment is protected against external attacks. In addition, this architecture keeps the operators working on this equipment away from the coldest parts (reservoir, etc.).

Preferably, all or some of the valves 13, 14, 15, 18, 21, 34 arranged in the housing 10 are all-or-nothing type valves. Of course, one or more valves can be flow and/or pressure regulation valves (progressive opening in particular).

This provides a simple and reliable structure.

In addition, also preferably, all or some of the valves 13, 14, 15, 18, 21, 34 arranged in the housing 10 are electrical control type valves. In addition, these valves are controlled and transmit a signal, in particular to an electronic data storage and processing component 26 (wireless and/or wired connection) see FIG. 1 and FIG. 2, representing their open or closed state. This electronic data storage and processing component 26 can comprise a microprocessor, a computer or any equivalent device and can be particularly configured to control the opening or the closing of the valves. Preferably, the electrical/electronic components of the device are arranged outside the housing 10.

As illustrated, the circuit for filling the internal reservoir 2 can comprise a liquid filling pipe 4 provided with an upstream end emerging at a wall of the housing 10 (filling connector 40 intended to engage with a filling component, such as a pistol or a nozzle at the end of a flexible hose). The filling pipe 4 comprises a downstream end emerging at a lower end of the internal wall of the internal reservoir 2. This liquid filling pipe 4 comprises at least one valve 34 located in the housing 10.

The circuit 6, 7 for tapping fluid from the reservoir can comprise a tapping pipe 6 provided with a first upstream end 16 emerging at a lower end of the internal wall of the internal reservoir 2 and a downstream end emerging at a wall of the housing 10 (tapping connector 46 intended to be connected, for example, to a pipe routing the fluid fuel to a user 27, such as a fuel cell, for example). The tapping pipe 6 can comprise, arranged in series, at least one valve 13, 14, 15 and a heat exchanger 12 for heating the fluid (vaporizer). As illustrated, the tapping pipe 6 can particularly comprise, arranged in series, a first valve 13, the heating heat exchanger 12, then two other valves 14, 15 in series. This allows liquid to be tapped that is vaporized in order to provide fuel gas downstream.

The circuit 6, 7 for tapping fluid from the reservoir preferably comprises a second upstream end 17 emerging at an upper end of the reservoir 5. This second upstream end 17 can be connected to the downstream end of the tapping circuit upstream of the heating heat exchanger 12 (via a valve 18, for example).

The circuit for regulating the pressure in the reservoir 5 can, for its part, comprise a pressurization pipe 8 comprising an upstream end 19 emerging at a lower end of the internal wall of the internal reservoir 2 and a downstream end 20 emerging at a separate point of a wall of the internal reservoir 2, in particular at an upper end of the internal reservoir 2. This pressurization pipe can comprise, arranged in series, at least one valve 21 and a heating heat exchanger 22. This allows liquid fuel to be withdrawn, heated (vaporized) and reintroduced into the reservoir in order to increase the pressure therein. This pressurization exchanger 22 can be an exchanger separate from the exchanger 12 of the tapping circuit. As a variant, these two exchangers 12, 22 can be coupled together or shared.

The device 1 can comprise one or more sensor(s) and in particular at least one from among: a sensor 23 for measuring the pressure in the reservoir (for example, measuring the pressure in a pipe 17 connected to the inside of the internal wall 2), a sensor 25 for measuring the pressure of the fluid in the housing 10, a sensor 24 measuring the pressure. All or some of these sensors can be arranged in the housing 10, whilst being connected to the volumes of the reservoir 5, the pressures of which are measured. The signals from these sensors can be transmitted to the electronic data processing and storage component 26. This component 26 can control the valves 26, in particular as a function of these signals, as described hereafter.

Thus, the electronic data processing and storage component 26 can be configured (programmed) to tap fuel and to feed a user component 27 and/or to control (regulate) the pressure inside the reservoir, in particular when the fuel is not tapped or when the reservoir is full.

For example, the electronic storage component 26 can be configured to tap the fuel in the liquid part (lower) or gas part (upper) of the reservoir 2 according to the pressure prevailing in the reservoir 5.

Thus, when the measured pressure 24 in the internal reservoir 2 is higher than a first determined threshold, for example, ranging between 3 and 5 bar (depending on the type of reservoir and on the application), the valves are controlled to tap the fuel in gas form from the gas phase of the reservoir (via the second upstream end 17 of the tapping circuit, valve 18 open, valve 13 closed). This allows the vaporization of the gas in the internal reservoir 2 to be reduced ("boil-off").

However, when the pressure in the reservoir 5 is lower than a second determined threshold (which can be equal to the first aforementioned threshold), the fuel is tapped in liquid form from the gas phase of the reservoir (valve 13 open, valve 18 closed).

The electronic storage component 26 can be configured to also pressurize the reservoir if necessary.

This increase in pressure can be implemented by withdrawing liquid fuel (valve 21 open), heating it in the exchanger 22 and reintroducing this heated fluid into the reservoir 2 (via the end 20). This increase in pressure is independent of the fuel consumption. This process is advantageously rapid and flexible.

Alternatively or in combination, the pressure can be increased via electrical heating in the reservoir. This electrical heater can be powered by a battery that is optionally Rechargeable via a fuel cell, which is fed with hydrogen originating from the reservoir 5 (in particular vaporization gas).

As illustrated in the variant of FIG. 2, the pressure also can be increased by withdrawing fuel from the tapping circuit at the outlet of the vaporization exchanger 12 via a bypass 32. This heated fluid then circulates in an exchanger 28 located in the reservoir 2 (for example, immersed in the liquid phase) in order to add calories to the content of the reservoir 2. This fluid then can be mixed with the fluid of the tapping circuit downstream of the exchanger 12. This pressure increase can be used when tapping fluid via the tapping circuit.

As is particularly illustrated in FIG. 2, the device can comprise a pipe connecting an upstream end (connector emerging at the housing 10) and an end emerging at the upper part of the internal reservoir 2 to allow filling in the gas phase.

The device can be integrated in any vehicle: motor vehicle, boat, aircraft.

Figure 3:
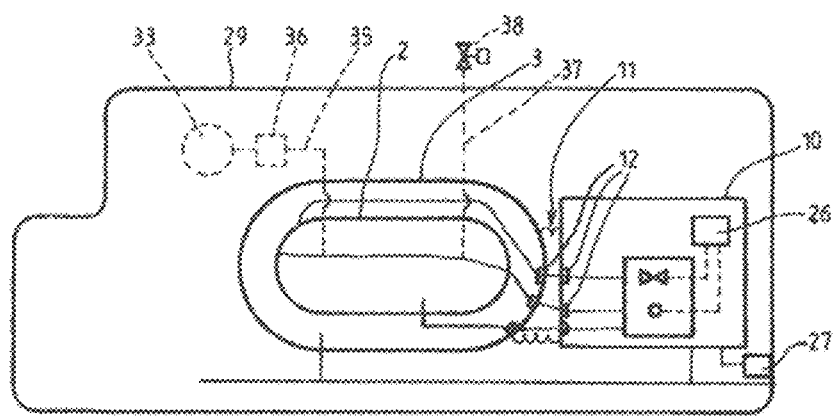
FIG. 3 shows a simplified view of a device for storing and for supplying fuel integrated in a vehicle with its equipment housing in a connected position.
Figure 4:
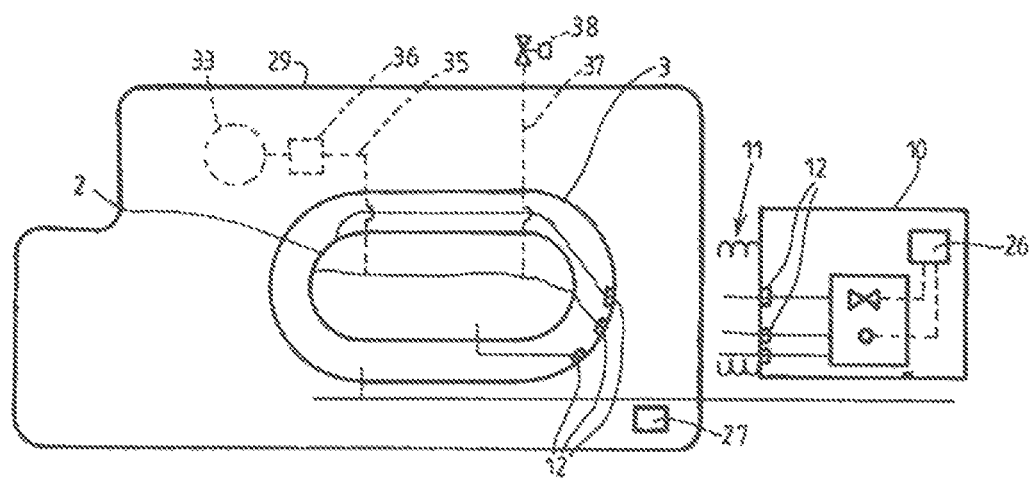
FIG. 4 shows a simplified view of a device for storing and for supplying fuel integrated in a vehicle with its equipment housing in a separated position.

The device can comprise the following features (alternative features independent of or in addition to the aforementioned features). To ensure safety in the event of a malfunction, the device can comprise a system for rapidly draining the content of the reservoir. As schematically illustrated in FIG. 3 and in FIG. 4, this rapid drainage system can comprise, for example, a sealed container 33 containing a pressurized gas (an inert gas, helium, for example) connected to an opening component 36 (shear disc or electrical and/or pyrotechnic actuator), which allows the content of the reservoir to be drained with a pressurized gas fluid, for example, to a vent line. This pressurized gas container 33 can be housed by the device 1 or the vehicle that integrates the device 1 and can be connected to the internal volume of the internal reservoir 2 via a discharge pipe 35. A separate discharge pipe 37 can be provided (fitted with at least one valve or flap 38) to outwardly discharge the content (pipe connected to the inside of the reservoir in the upper or lower part and emerging in a discharge or recovery zone).

This discharge pipe can be connected, if applicable, to the liquid tapping pipe.

The container 33 or reserve alternatively could contain hydrogen, which could form an additional fuel reserve if required other than for draining.

All or some of the external wall of the external reservoir 3 can form part of the structure of the vehicle that houses the reservoir. For example, the external wall connected to a wall of the vehicle and/or to a one-piece part in order to ensure the mechanical strength of the vehicle.

The vaporization gas in the internal reservoir 2 ("boil-off" gas) can be recovered in an external buffer reservoir of a filling station, for example, via a suitable pipe connected to the tapping connector 46, for example.

For example, this recovered gas can be used to charge a battery via at least one fuel cell of the vehicle or via a separate entity. The recovered gas also can be burnt (catalytic burner or flare).

In order to pressurize the reservoir without consuming electricity (or with reduced electricity consumption) it can be useful to be able to add the necessary energy in a few minutes in order to increase the pressure and the temperature in the reservoir 5. This could be supplied by a filling lorry or station connected to the vehicle comprising the storage device 1. This pressurization also can be implemented by a sealed pressurized gas reserve integrated in the device 1 or the vehicle carrying said device. This reserve can be connected to the reservoir 5 via a discharge pipe provided with one or more valve(s).

Advantageously, the reservoir 5 may be removed from the vehicle, i.e. replaceable (an empty reservoir 5 replaced with a full reservoir 5). This safeguards the operations and in particular reduces the constraints relating to filling by transferring fuel into the empty reservoir. This can be obtained via a rapid connection/disconnection interface between the reservoir 5 and the circuits that are connected thereto.

Thus, whilst being a simple and inexpensive structure, the device allows the complexity, the bulk, the mass and the maintenance constraints to be reduced compared to the prior art.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for storing and for supplying fluid fuel, comprising:
   a reservoir of liquefied hydrogen in equilibrium with gaseous phase of hydrogen;
   a filling circuit configured to fill the reservoir;
   at least one tapping circuit configured to tap fluid from the reservoir;
   at least one pressure regulating circuit configured to regulate a pressure in the reservoir; and
   a housing, wherein:
   the filling, tapping and pressure regulating circuits comprise a set of valves arranged in the housing separate from the reservoir;
   the housing is removably connected to the reservoir via a demountable mechanical coupling system;
   the tapping, pressure regulating, and filling circuits comprise a set of demountable fluidic connectors located at a junction between the reservoir and the housing and which are configured to allow separation, during demounting of the housing with respect to the reservoir, between portions of said circuits located in the reservoir and portions of said circuits located in the housing; and
   when the housing is connected to the reservoir, the housing defines a closed volume filled with an atmosphere predominantly comprising an inert gas.

2. The device of claim 1, wherein, when the housing is connected to the reservoir, the closed volume defined by the housing is independent of an internal volume of the reservoir.

3. The device of claim 1, wherein each of the valves of the set of valves is an all-or-nothing type valve.

4. The device of claim 1, wherein each of the valves of the set of valves is an electrical control type valve.

5. The device of claim 1, wherein:
   the filling circuit comprises a liquid filling pipe provided with an upstream end emerging at a wall of the housing and a downstream end emerging at the wall of the reservoir at a lower end thereof; and
   said liquid filling pipe comprises at least one valve located in the housing.

6. The device of claim 1, wherein:
   the tapping circuit comprises a tapping pipe that is provided with a first upstream end emerging at a wall of the reservoir, at a lower end of thereof, and a downstream end emerging at a wall of the housing; and said tapping pipe further comprises, arranged in series, at least one valve and a heating heat exchanger.

7. The device of claim 6, wherein:
the tapping circuit comprises a second upstream end emerging at the wall of the reservoir at an upper end thereof; and
said second upstream end is connected to the downstream end via at least one valve and the heating heat exchanger.

8. The device of claim 1, wherein:
the pressure regulating circuit comprises a pressurization pipe;
the pressurization pipe comprises an upstream end emerging at a wall of the reservoir, at a lower end of thereof, and a downstream end emerging at a separate point of the wall of the reservoir at an upper end thereof; and
said pressurization pipe further comprises, arranged in series, at least one valve and a heating heat exchanger.

9. The device of claim 1, wherein:
the pressure regulating circuit comprises a heating exchanger housed in the reservoir for thermally exchanging with the fuel stored in the reservoir; and
the exchanger is fed, via a pipe, with a hot fluid, the hot fluid being liquid fuel that has been tapped from the reservoir and heated after being tapped.

10. The device of claim 1, further comprising at least one of a reservoir sensor located in the housing configured to measure the pressure in the reservoir and a fluid sensor located in the housing configured to measure the pressure of the fluid in the housing.

11. The device of claim 1, further comprising an electronic data storage and processing component connected to the set of valves, wherein the electronic data storage and processing component is configured to control an opening or closing of the valves.

12. The device of claim 1, further comprising a rapid drainage system that comprises a sealed container containing pressurized helium, a component for opening the container, a discharge pipe connecting the container to the storage volume of the reservoir, and a discharge pipe that is provided with at least one valve or a flap for discharging the fluid out of the reservoir.

13. The device of claim 1, wherein the inert gas is helium.

14. A vehicle comprising the device of claim 1.

15. A method for providing a consumer with fuel from a storage and supply device of claim 1, comprising the steps of:
providing the device of claim 1;
when the pressure in the reservoir is higher than a first determined threshold, tapping the fuel in gas form from the gas phase of the reservoir; and
when the pressure in the reservoir is lower than a second determined threshold, tapping the fuel in liquid form from the reservoir.

16. The method of claim 15, wherein the pressure in the reservoir is increased by withdrawing fuel in liquid form from the liquid phase of the reservoir, heating the withdrawn liquid fuel to provide heated fuel, and reintroducing the heated fuel into the reservoir.

17. The method of claim 15, wherein the pressure in the reservoir is increased via a heater located in the reservoir.

18. The method of claim 17, wherein the heater is a heat exchanger fed with fuel that has been tapped from the reservoir, heated, and set to exchange heat with the fuel in the reservoir.

* * * * *